(12) United States Patent
Butterworth

(10) Patent No.: US 8,230,253 B2
(45) Date of Patent: Jul. 24, 2012

(54) BYZANTINE FAULT TOLERANT DYNAMIC QUORUM USING A TRUSTED PLATFORM MODULE

(75) Inventor: Henry E. Butterworth, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 12/176,640

(22) Filed: Jul. 21, 2008

(65) Prior Publication Data

US 2010/0017644 A1     Jan. 21, 2010

(51) Int. Cl.
*G06F 11/00* (2006.01)
(52) U.S. Cl. ......................................................... 714/4.1
(58) Field of Classification Search .................... 714/4.1
See application file for complete search history.

(56) References Cited

U.S. PATENT DOCUMENTS

| | | | |
|---|---|---|---|
| 6,671,821 B1 | 12/2003 | Castro et al. | |
| 2002/0129296 A1* | 9/2002 | Kwiat et al. | 714/10 |
| 2006/0031467 A1* | 2/2006 | Hasti et al. | 709/224 |
| 2006/0129633 A1* | 6/2006 | Potluri et al. | 709/203 |
| 2007/0214355 A1* | 9/2007 | Lamport | 713/156 |
| 2008/0141027 A1* | 6/2008 | Kim et al. | 713/156 |

OTHER PUBLICATIONS

Byung-Gon Chun, et al.; "Attested Append-Only Memory: Making Adversaries Stick to their Word"; http://www.cs.berkeley.edu/~bgchun/a2m-sosp07.pdf ; SOSP'07, Oct. 14-17, 2007, Stevenson, Washington, USA.; pp. 1-16.

Evelyn Tumlin Pierce; "Self-Adjusting Quorum Systems for Byzantine Fault Tolerance"; Dissertation presented to the Faculty of the Graduate School of the University of Texas at Austin; Dec. 2000; includes cover page, pp. ii-viii and pp. 1-76.

* cited by examiner

*Primary Examiner* — Scott Baderman
*Assistant Examiner* — Jigar Patel
(74) *Attorney, Agent, or Firm* — Randall J. Bluestone; Roberts Mlotkowski Safran & Cole. P.C.

(57) ABSTRACT

A method implemented in a computer infrastructure having computer executable code tangibly embodied on a computer readable medium. The computer executable code is operable to dynamically adjust quorum requirements for a voting set V of a server cluster, including a plurality of servers, to ensure that a response of the server cluster to a client request remains Byzantine fault tolerant when at least one of: a failed server of the server cluster is replaced with at least one new server, such that a total set S of servers that have ever been members of the server cluster is increased, and an existing server is removed from the voting set V.

5 Claims, 5 Drawing Sheets

BYZANTINE FAULT TOLERANT DYNAMIC QUORUM USING A TRUSTED PLATFORM MODULE

FIELD OF THE INVENTION

The present invention generally relates to managing servers, and more particularly, to a method and system for managing servers utilizing a Byzantine fault tolerant dynamic quorum using a trusted platform module.

BACKGROUND

A server computer (often called server for short) is a computer system that has been designated for running a specific server application. Server applications can be divided among server computers over an extreme range, depending upon the workload. Every server application can run concurrently on a single computer under light loading, but multiple server computers may be required for each application under a heavy load. Thus, a server cluster (often called a cluster for short) may utilize multiple servers or nodes working in conjunction and communicating with one another.

The growing reliance of industry and government on servers and, e.g., the online information services they provide makes the consequence of failures of these servers more serious. Furthermore, malicious attacks on these servers have become increasingly attractive to some. For example, a node (or server of a cluster) may be providing incorrect responses due to errors in implementation of the node (e.g., "bugs") or may be operating incorrectly as a result of an attack by a malicious outside party. Attackers may compromise the correct operation of a node, and may also disrupt communication between nodes, overload nodes in "denial of service" attacks, or send messages to nodes attempting to impersonate other correctly operating nodes The aim of Byzantine fault tolerance is to be able to defend against a Byzantine failure, in which a component (e.g., a node or server) of some system not only behaves erroneously, but also fails to behave consistently when interacting with multiple other components (e.g., other nodes or servers). Correctly functioning components (e.g., nodes or servers) of a Byzantine fault tolerant system will be able to reach the same group decisions regardless of Byzantine faulty components. For example, if a cluster comprises four servers (nodes), if the cluster is Byzantine fault tolerant, the cluster will not take some specified action without agreement between some subset, e.g., a quorum, of the four servers. By requiring decisions be made by a quorum of the voting members of a server cluster, the Byzantine fault tolerant system protects against, e.g., malicious attacks through decisions made by, e.g., a compromised server.

Continuing with the above example, a situation may arise where one of the servers of the cluster fails. In practice, when a server fails, it is desirable to either repair it or replace it with another server. However, when repairing a faulty server or replacing a faulty server with a new server, steps should be taken to ensure the cluster remains Byzantine fault tolerant.

One conventional method for providing a Byzantine fault tolerant system assumes a static, finite set of servers S and presents a mechanism which allows a quorum to be varied dynamically according to an estimate of the number of faulty servers amongst that finite set S. The above solution works for the case of a repaired server because the set S is not affected. That is, if the server is repaired, then the total number of servers in the set S does not change. It is also possible to make the above solution work for replaced servers if a manual process is performed that ensures that a failed server is permanently disabled before another is configured with the same identity and brought online to replace it. In this case, the actual set of physical servers used may be unbounded over time but the logical set of server identities is finite and so is compatible with the assumption of the static set S.

However, as noted above, this conventional method requires a static set of servers. That is, this conventional method does not allow the set S of servers to be infinite over time such that failed servers may be replaced and the quorum requirements adjusted dynamically to include the new servers and exclude the failed servers without any manual intervention to guarantee that failed servers are permanently disabled.

An additional drawback with the replacement scenario is the need for manual intervention to ensure that a failed server is permanently disabled before a replacement is brought online. That is, the only way to replace failed nodes is to bring in new nodes and configure them to have the same identity as the failed node. Moreover, it is not possible to do this without manual intervention, which is error prone and likely to be a source of error. For example, two nodes may accidentally end up with the same identity, which may cause problems. Additionally, the manual replacement increases maintenance costs. Also, with the manual replacement scenario, it is possible for a set of discarded nodes to be reactivated and then masquerade as a quorum of the server cluster.

With another conventional method, a trusted third party known to the clients is used that the clients may query for the current voting set. However, this method requires an additional trusted third party, which increases costs.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable medium. The computer executable code tangibly embodied on a computer readable medium is operable to dynamically adjust quorum requirements for a voting set V of a server cluster, comprising a plurality of servers, to ensure that a response of the server cluster to a client request remains Byzantine fault tolerant when at least one of: a failed server of the server cluster is replaced with at least one new server, such that a total set S of servers that have ever been members of the server cluster is increased, and an existing server is removed from the voting set V.

In another aspect of the invention, a system comprises a server cluster comprising a plurality of servers, wherein each server includes a trusted platform module (TPM) operable to at least one of maintain a voting set V, manipulate the voting set V and service requests for the voting set V.

In an additional aspect of the invention, a computer program product comprising a computer usable medium having readable program code embodied in the medium is provided. The computer program product includes at least one component operable to dynamically adjust quorum requirements for a voting set V of a server cluster, comprising a plurality of servers, to ensure that a response of the server cluster to a client request remains Byzantine fault tolerant when at least one of: a failed server of the server cluster is replaced with at least one new server, such that a total set S of servers that have ever been members of the server cluster is increased, and an existing server is removed from the voting set V.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
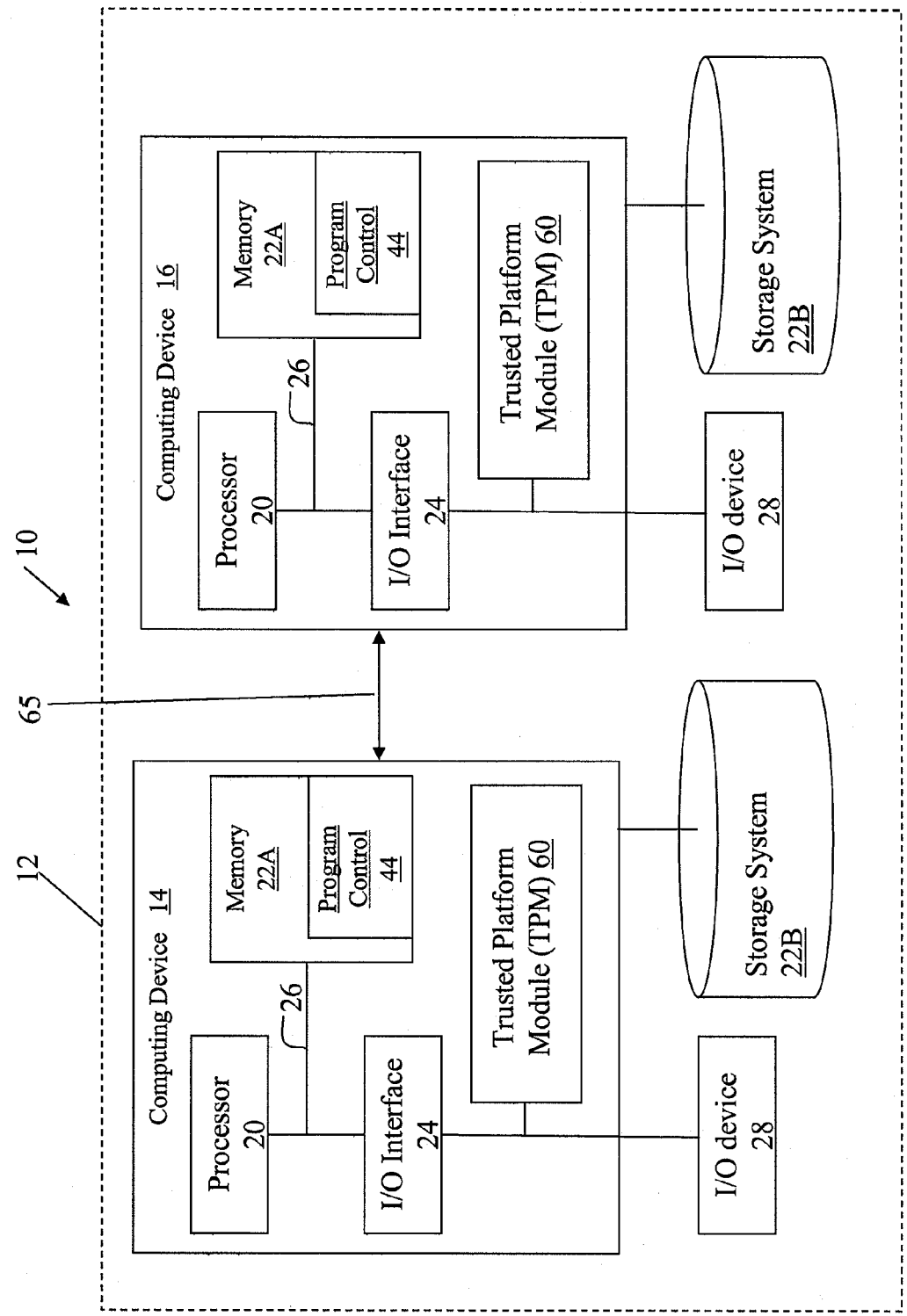
FIG. 1 shows an illustrative environment for implementing the steps in accordance with the invention.

The present invention generally relates to managing servers, and more particularly, to a method and system for managing servers utilizing a Byzantine fault tolerant dynamic quorum using a trusted platform module. More specifically, the present invention, given a Byzantine fault tolerant distributed consensus protocol and corresponding selection of quorum rules (which may be user-configurable), provides for Byzantine fault tolerance for failures outside a trusted platform module and fail-stop fault tolerance for failures inside the trusted platform module.

A specific problem when a set of servers S is unbounded (and failed servers are not permanently disabled, for example, with a manual process) is that there may come a time when some set of failed servers is sufficient to attain quorum for some cluster membership (referred to as voting set) that was historically valid (e.g., an old voting set that is no longer valid). For example, consider a four node cluster with a quorum requirement of three. That is, decisions by the cluster require agreement between at least three of the four nodes. Carrying on with the example, consider that over time, three nodes fail and are replaced by three replacement nodes. Conventionally, if the three failed nodes (which were not permanently disabled) were to collaborate with each other, they would be able to meet the quorum requirement of the original cluster and would be able to masquerade as a valid embodiment of the cluster and, for example, service clients maliciously.

An aim of the present invention is the ability to replace failed servers with new servers such that the set of servers that have ever been used as members of the server cluster can grow over time without limit, while ensuring the system remains Byzantine fault tolerant. This allows, for example, an upgrade of the hardware an all nodes in the cluster by cycling a new set of nodes into the cluster one by one and throwing the old nodes away, while protecting from a situation where an old set of nodes is reactivated.

According to an aspect of the invention, the set N of nodes that have ever been part of the cluster must be allowed to be unbounded and at any time there must be a voting set V which is the set of nodes that are current cluster members. Thus, the voting set V is a subset of the set N of nodes. The quorum, which ensures Byzantine fault tolerance, must be obtained from the voting set V. Moreover, as the cluster may change the voting set V over time, as described above, a dynamic quorum allows the quorum requirements to be kept reasonably small and maintained on a set of nodes which are currently active or which have been active fairly recently.

According to an aspect of the invention, each node or server includes a trusted platform module (TPM), which is used on each node to maintain, manipulate and service requests for the voting set for the server cluster. Implementing the present invention allows the set of servers to be unbounded over time whilst guaranteeing that clients can detect when failed server nodes, which have been excluded from the current cluster, try to collaborate to service the clients' requests maliciously.

Additionally, by implementing the present invention, historically valid but no longer current quorums cannot reactivate as part of a current quorum. Moreover, the need for an additional trusted third party is eliminated by distributing its function amongst the nodes of the server cluster itself using the trusted platform module (TPM).

System Environment

FIG. 1 shows an illustrative environment 10 for managing the processes in accordance with the invention. To this extent, the environment 10 includes computer infrastructure 12 that can perform the processes described herein, e.g., allowing the set of servers to be unbounded over time whilst guaranteeing that clients can detect when failed server nodes, which have been excluded from the current cluster, try to collaborate to service the clients requests maliciously. The computer infrastructure 12, e.g., a server cluster, includes computing devices 14 and 16, which function as servers or nodes. While FIG. 1 only shows the computer infrastructure 12 (e.g., server cluster) comprising two computing devices 14 and 16 (e.g., servers), it should be understood that the invention contemplates that the cluster may comprise any number of servers. In embodiments, the computing devices 14 and 16 may each include a processor 20, a memory 22A, an input/output (I/O) interface 24, and a bus 26. Additionally, the computer devices 14 and 16 each include a trusted platform module (TPM) 60 in accordance with an aspect of the invention. The memory 22A can include local memory employed during actual execution of program code, bulk storage, and cache memories which provide temporary storage of at least some program code in order to reduce the number of times code must be retrieved from bulk storage during execution.

Further, the computing devices 14 and 16 are in communication with an external I/O device/resource 28. The I/O device 28 can interact with the computing device 14 or any device that enables the computing device 14 to communicate with one or more other computing devices using any type of communications link. The external I/O device/resource 28 may be keyboards, displays, pointing devices, etc. Additionally, in embodiments, the computing devices 14 and 16 include a storage system 22B.

The processor 20 executes computer program code (e.g., program control 44) processes on computer media, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing devices 14 and 16.

The computing devices 14 and 16 can comprise any general purpose computing article of manufacture capable of executing computer program code installed thereon (e.g., a personal computer, server, handheld device, etc.). However, it is understood that the computing devices 14 and 16 are only representative of various possible equivalent computing devices that may perform the processes described herein. To this extent, in embodiments, the functionality provided by the computing devices 14 and 16 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 (e.g., a server cluster) is only illustrative of various types of computer infrastructures for implementing the invention. For example, in embodiments, the computer infrastructure 12 comprises three or more computing devices that communicate over any type of communications link 65, such as a network, a shared memory, or the like, to perform the processes described herein. Further, while performing the processes described herein, one or more computing devices 14 and 16 in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Trusted Platform Module

According to an aspect of the invention, each server node contains the trusted platform module (TPM) 60. Moreover, the TPM 60 is used on each server node to maintain, manipulate and service requests for the voting set for the server cluster. In embodiments, the TPM 60 is a tamper-proof computer with, e.g., software, that must execute properly or stop executing. In this way, the TPM 60 provides for fail-stop fault tolerance within the TPM 60.

In embodiments, the TPM 60 may include the following components: a common endorsement key; a unique endorsement key; and an interface. In embodiments, the common endorsement key (CEK) is a key shared by the TPMs 60 on at least all nodes for a given cluster. Moreover, the CEK is only known by the TPMs 60. For example, in embodiments, the CEK may be a combined public key and private key. The TPM may sign with the private key, which can be verified by the public key as is understood by one of skill in the art of encryption systems. That is, the private keys may be kept securely within the TPMs and the public keys may be used as identifiers for the nodes in the voting set. Moreover, the private keys may be used by the TPMs for signing and the public keys may be used by the clients and other TPMs for verification. The public CEK should be distributed to the clients using a secure key distribution mechanism. Once the client has the public CEK key and the identity of its server cluster, it can use the public CEK key to verify any discovered voting sets for its cluster and get the public keys (i.e. identities) of the cluster members from a verified voting set.

Thus, according to an aspect of the invention, the CEK may be used to verify that a message is from another TPM of the server cluster, ensuring that the message can be trusted. That is, if a message signed by the CEK is received by a node, the TPM of the node by verifying the CEK signature, ensures that the message is from another TPM.

In embodiments, the CEK may be installed into all TPMs at manufacturing time. Alternatively, in embodiments, the CEK may be passed to each TPM of a cluster during a secure deployment operation when a node is first deployed within an organization (e.g., to avoid potential problems if a global key were to become compromised). Additionally, the invention contemplates that the TPMs 60 may have installed CEKs that may also be altered, e.g., by a secure deployment operation.

According to a further aspect of the invention, the unique endorsement key (UEK) is a key used by a TPM, which is unique to a particular TPM. The UEK is used to verify that a message came from a specific TPM (and its corresponding node). According to an aspect of the invention, the CEK and the UEK together can respectively verify that a message came from another TPM, and came from a specific TPM (and its corresponding node).

According to a further aspect of the invention, in embodiments, an interface is provided, which allows the remainder of the software on a node to perform a specific set of operations on a voting set of nodes, which is maintained by the TPMs 60. Additionally, the user interface allows the remainder of the software to request that the TPM sign messages for transmission to other nodes or clients, as discussed further below.

In operation, all manipulations of the voting set are performed within the TPMs. In this way, the TPMs allow for safe manipulations of the voting set. The voting set of a cluster is a list of nodes that currently represent the cluster. As described above, the member nodes of the voting set may dynamically change. As described further below, each new version of the voting set is assigned a voting set version number. Thus, with each voting set change, the voting set version number is incremented, as described further below.

Communications or messages between the TPMs of the nodes of a server cluster may be "signed" in a self-describing manner (for example, by starting with a header containing a value specifying the message type). According to an aspect of the invention, the TPMs will only sign voting set messages that have been verified as containing a copy of the same current voting set with the correct voting set version number, as described further below. That is, a particular TPM will only sign cluster response message received with the cluster identifier and version number which corresponds to the particular TPM's current voting set and current voting set version number. Thus, in this way, clients are guaranteed that TPM signed voting set messages contain voting sets that were historically valid for the specified cluster. For example, if a client sees a message that is described as coming from a node with a correct voting set, then that voting set was at least valid sometime in the past. However, while the voting set may have been valid sometime in the past, the voting set may not be the current voting set, as described further below.

Additionally, according to an aspect of the invention, clients may include a nonce, e.g., a number used once, in their requests to the server cluster. Moreover, the server cluster includes a copy or digest of the request encompassing the nonce in the response sent back to the client. For example, a client may request action Y as request #5. In response, a cluster may indicate "result of action Y, request #5". Thus, according to an aspect of the invention, clients of the server cluster can validate a cluster response by checking that the response was signed by a quorum of TPMs from the correct cluster and voting set version referenced in the response, and by also verifying that the returned digest corresponds to the request that was sent. If so, according to an aspect of the invention, the client is guaranteed that the response is a new response and that the voting set was current for the cluster when the response was made. Additionally, the client is guaranteed that the response was checked by a quorum of the current voting set and so can be considered valid subject to the fault tolerance threshold of the quorum rules chosen for the system.

For example, assume that a cluster comprises servers A, B, C and D. Additionally, assume that the quorum rules chosen for the system allow for a single Byzantine failure and require decisions be made with agreement between three of the four servers. If a response to a client request is only signed by A, the response must not be considered valid. However, if the response is signed by A, B and C, then the response meets the chosen quorum requirements and may be considered valid. If there is at most one compromised server, for example server A, then the response will indeed be valid. However, if there are more Byzantine failures than allowed for by the choice of quorum rules, for instance if both servers A and B were compromised in this example, then the response may in fact not be valid.

Cluster Creation

In embodiments, a cluster may be created from a single node by making a request to the TPM on that node to create a new voting set. The TPM 60 creates a new, unique for all time cluster identifier and a voting set consisting of just the local node. In embodiments, the cluster identifier may be represented as a 2-tuple of the unique endorsement key (UEK) of the TPM 60 and an integer (a cluster identifier version number) which the TPM 60 increments for each voting set creation request. Moreover, in embodiments, the integer may be represented using sufficient bits, such that it would be acceptable for the TPM 60 to disable itself permanently (causing a node failure) rather than reuse any value for the integer. It should be understood that, as there is only one node in the cluster at this point, the cluster cannot be Byzantine fault tolerant.

After creation of the cluster, additional nodes may be added to the cluster, as described further below. The voting set is a list of nodes that currently represent the cluster. In embodiments, the voting set may be represented as a list of the UEKs of the TPMs 60 of the nodes in the cluster. Moreover, as described above, the voting set also includes a version number (e.g., a 64-bit number) which is incremented monotonically for each manipulation of the current voting set. Moreover, each TPM 60 of the cluster maintains the list of nodes that comprise the current voting set.

Flow Diagrams

Figure 2:
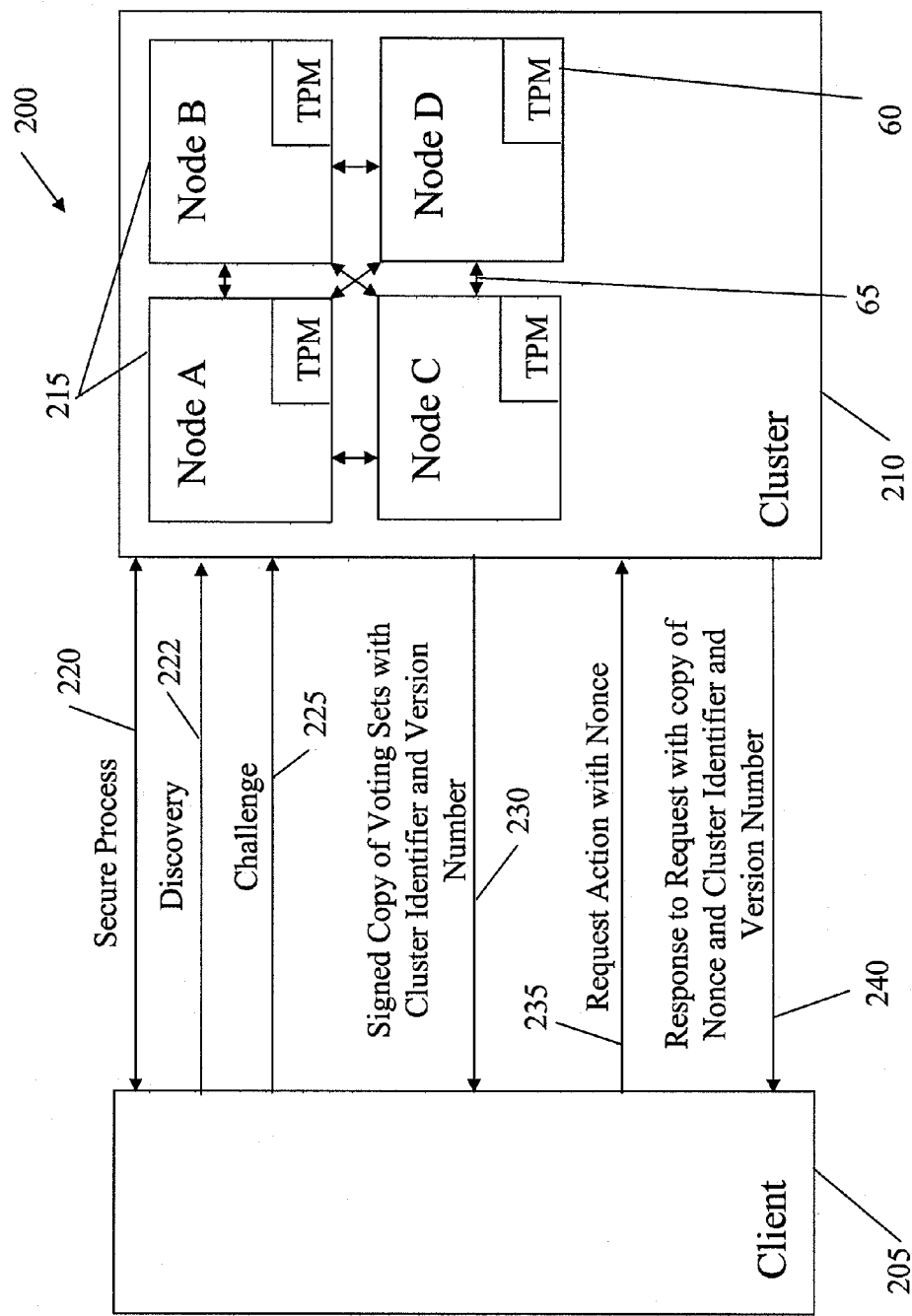
FIGS. 2 and 3 shows exemplary flows illustrating interaction of a client with a cluster in accordance with aspects of the invention.
Figure 3:
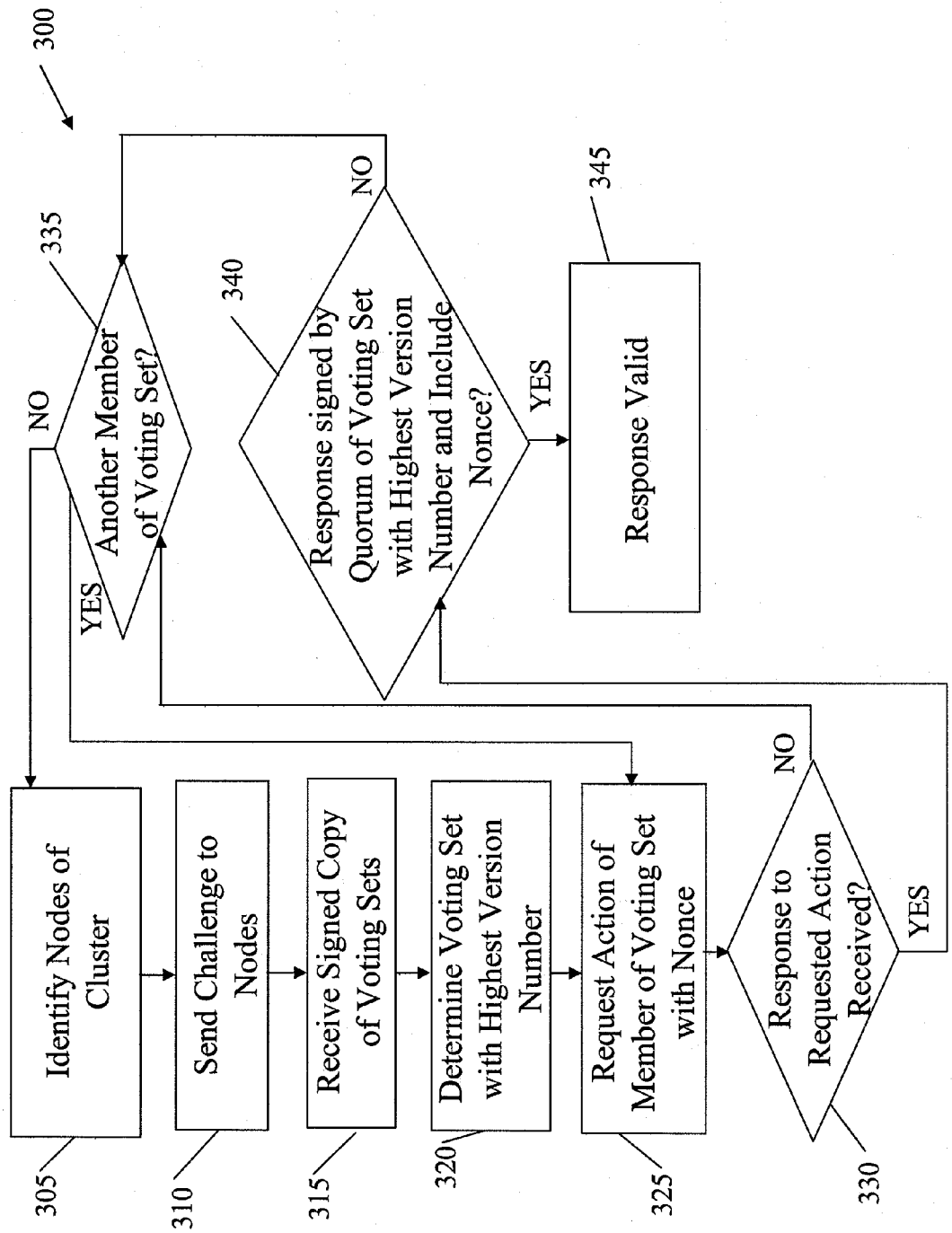
Figure 4:
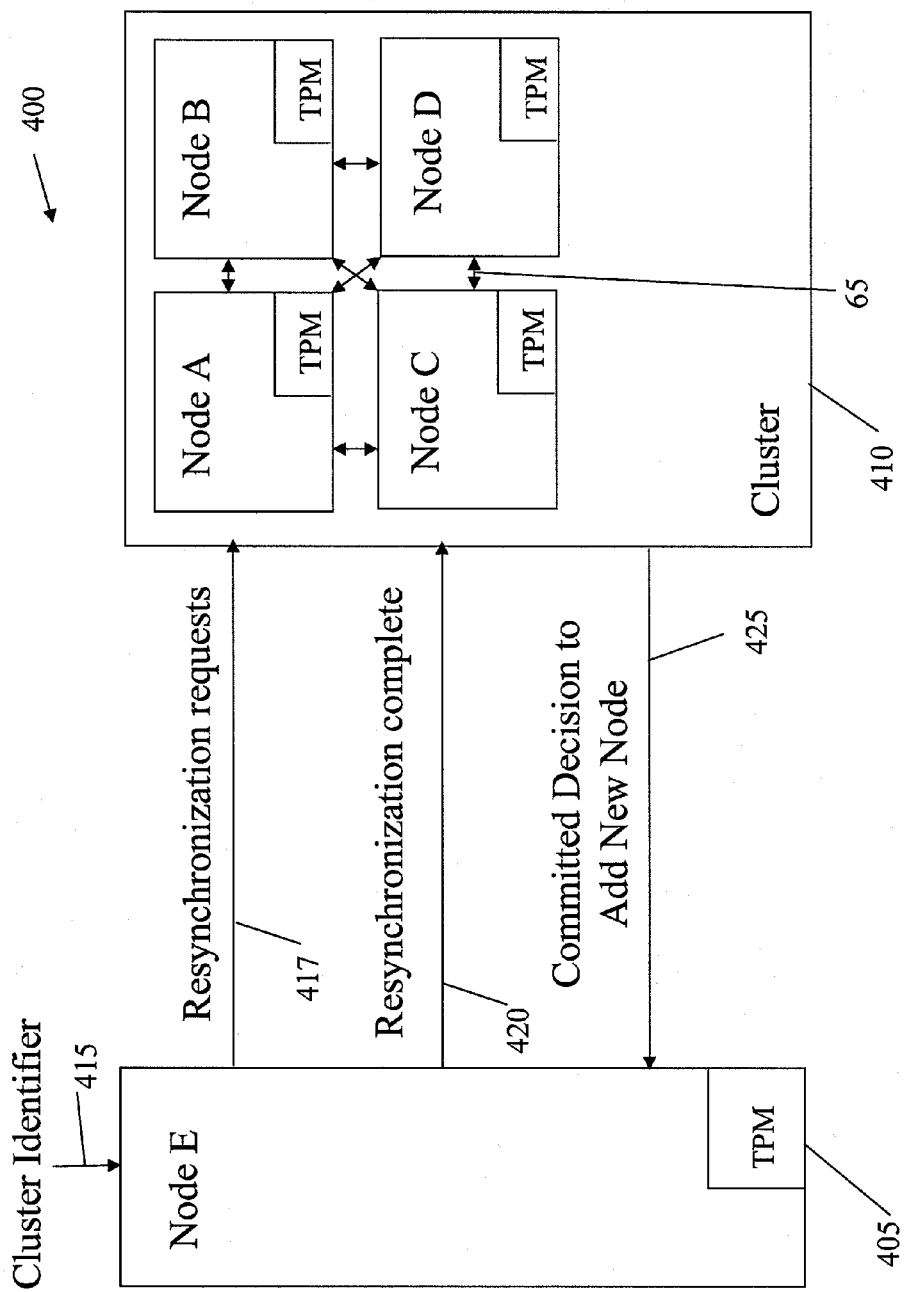
FIGS. 4 and 5 shows an exemplary flows for adding a new node to an existing cluster in accordance with aspects of the invention.
Figure 5:
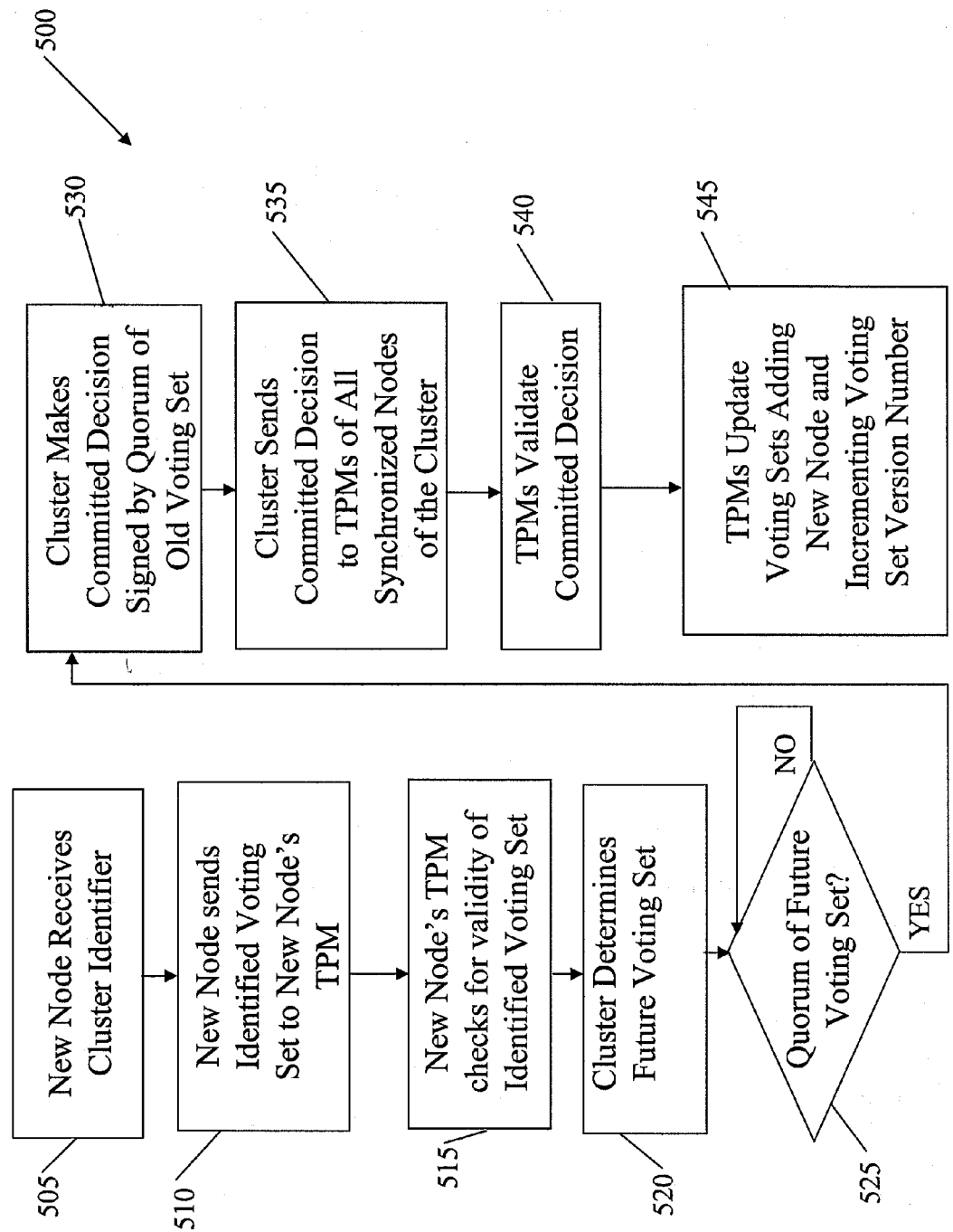

FIGS. 2-5 show exemplary flows for performing aspects of the present invention. More specifically, FIGS. 2 and 3 show exemplary flows for interaction between a client and a cluster and FIGS. 4 and 5 show exemplary flows for adding a new node to a cluster. The steps of FIGS. 2-5 may be implemented in the environment of FIG. 1, for example. The flow diagrams may equally represent high-level block diagrams of the invention. The flowchart and/or block diagram in FIGS. 2-5 illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Interaction of Client with a Cluster

FIG. 2 shows an exemplary flow 200 of the interaction of a client 205 with a cluster 210 in accordance with aspects of the invention. As shown in FIG. 2, the cluster 210 comprises four nodes 215, and each node 215 includes a TPM 60. Additionally, each node 215 of the cluster 210 communicates with the other nodes via communications link 65.

At step 220, a secure process is used to configure the client with the cluster identifier. This step is outside the scope of this disclosure, and as one of skill in the art would readily understand this step, no further discussion is necessary for an understanding of the present invention. At step 222, the client uses a discovery service to find nodes purporting to be members of the cluster. In embodiments, the discovery service may be implementation specific. For example, the discovery service may be broadcast on an Ethernet. At step 225, the client challenges each node 215 it finds to return a signed copy of the most recent voting set. At step 230, the nodes return signed copies of their respective most recent voting sets. Upon receiving the signed copy of the voting sets, the client examines all returned voting sets that pass validation to find the voting set with the correct cluster identifier and highest version number. The client is guaranteed that this discovered voting set: (1) was a valid voting set for the cluster at some point in the past; and (2) may be the current valid voting set. However, the client cannot be assured that the discovered voting set is the current voting set until a request is made by the client to the cluster and a response is received by the client from the cluster, as discussed further below.

According to an aspect of the invention, at step 235, the client makes a request of the cluster by sending the request to one of the members of the discovered voting set. Additionally, as discussed above, the request includes a nonce. If that member is currently operating correctly as part of the cluster, the request is serviced by the cluster and, at step 240, a response is returned to the client. In embodiments, the response includes the cluster identifier (including the current voting set version number) and a copy or digest of the request encompassing the nonce passed by the client in its request.

The cluster uses a Byzantine fault tolerant distributed consensus protocol to generate the response which is signed by the TPMs of a quorum of nodes in the current voting set. Moreover, before signing, the TPMs check that the cluster identifier is correct and the voting set version number in the response corresponds to their current version number.

Upon receiving the response from the cluster, the client validates the response. In embodiments, the client may validate the response by checking the cluster identifier and the digest (encompassing the nonce) to see that it is a response for the request that the client issued and checking that the returned version number corresponds to the version number of the voting set the client discovered. Additionally, the client checks that the response has been signed by a quorum of TPMs from that voting set to ensure that response meets the quorum requirements for Byzantine fault tolerance. If all of the checks pass then the client can consider the response valid.

According to a further aspect of the invention, if the client gets no response, an invalid response, or a response with an incorrect version number, then the client can retry the request to another member of its discovered voting set. If the client runs out of candidate targets from its discovered voting set, then the client may restart the discovery process to try to discover a newer voting set, and may then retry the request.

FIG. 3 shows an additional exemplary flow 300 for the interaction of a client with a cluster in accordance with aspects of the invention. At step 305, the client identifies nodes of a cluster, e.g., using a discovery service. At step 310, the client sends challenges to all the identified nodes requesting a signed copy of the most recent voting set with version number. At step 315, the client receives signed copies of the voting sets and version numbers from, e.g., each of the identified nodes.

At step 320, the client determines the voting set with the highest version number. At step 325, the client sends a request for action to a member of the voting set with the highest version number. This request includes a nonce to identify the request. At step 330, a determination is made as to whether a response to the request was received. If, at step 330, a response is received by the client, at step 340, a determination is made as to whether the response was signed by a quorum of the voting set with the highest version number and includes the nonce. If, at step 340, the response was signed by a quorum of the voting set with the highest version number and includes the nonce, then at step 345, the response is identified as a valid response, e.g., not a malicious response.

If, at step 330, no response was received by the client, then, at step 335, a determination is made as to whether there are any other members of the identified voting set. If, at step 335, it is determined that there is another member of the voting set, then the process continues at step 325, where a request is sent to another member of the identified voting set. If, at step 335, it is determined that there is not another member of the voting set, then the process continues at step 305, where the client restarts the discovery process to try to discover a newer voting set, and then retries the request.

Adding a Node to the Cluster

FIGS. 4 and 5 show exemplary flows for adding a new node to an existing cluster in accordance with aspects of the invention. To add a new node to the cluster securely, configuration must happen from both sides, i.e., at the new node, to tell the new node to accept the cluster, and at the cluster, to tell the cluster to accept the new node. A configuration or discovery process is used on the cluster to tell the cluster to accept the new node. Additionally, a secure process is used to pass the identity of the cluster to be joined to the new node itself.

More specifically, FIG. 4 shows a flow and communication 400 between the cluster 410 and a new node 405 (e.g., "Node E") according to an aspect of the invention. As shown in FIG. 4, each node of the cluster 410 communicates with the other nodes of the cluster via communications link 65.

With respect to the node side, at step 415, the node being added to the cluster is securely given the cluster identifier of the cluster to which the new node is being added. In embodiments, the cluster identifier may be given by the cluster itself or may come from another source. According to an aspect of the invention, at step 417, the new node acts as a client of the cluster to integrate and synchronize its state with the other nodes of the cluster, e.g., copy the cluster state from another node of the cluster onto itself. That is, the new node acts as a client of the cluster, as described above, to engage in a state resynchronization protocol with the cluster. Assuming the new node is non-faulty and assuming a quorum of non-faulty cluster nodes, the new node will eventually complete the resynchronization process and enter a state where it is up-to-date with the current cluster nodes.

The resynchronization process includes the new node 405 passing the discovered voting set to its TPM 60. The TPM 60 of the new node 405 checks that the discovered voting set is a valid voting set (signed by the TPMs of the current voting set) before accepting it. Additionally, at step 420, the new node notifies the cluster once it is resynchronized. Moreover, the new node is kept up-to date by inclusion (e.g., passively, as a non-voting member at this stage) in the cluster's distributed consensus protocol.

With respect to the cluster side, according to an aspect of the invention, the eventual result of the configuration or discovery process is a committed decision reached by the cluster using Byzantine fault tolerant distributed consensus protocol to add the new node to the cluster. However, the cluster must determine what the new voting set will be once the new node has been added. Additionally, the cluster must minimally wait until a quorum of the nodes of the future voting set are operational and synchronized before committing to the decision. Thus, in embodiments, this may involve waiting for the new node to resynchronize, e.g., if the new node will be part of the future voting set and is needed for a quorum.

At step 425, the committed decision of the cluster, which is, in embodiments, a response in the form of a message indicating the node to be added and including the cluster identifier and voting set version number to which the committed decision applies, is sent to the new node. According to an aspect of the invention, the message is signed by a quorum of the old voting set which ensures that it is a valid decision reached by the cluster. This message is passed to the TPMs on all the synchronized nodes of the cluster, which validate the cluster identifier, validate that the message is signed by a quorum of the old voting set and validate that the message applies to the current version number of the voting set. Then, according to an aspect of the invention, only if the validation is successful, the TPMs of the cluster (including the TPM of the new node) update their voting sets by adding the new node indicated in the message to the voting set and incrementing the voting set version number.

FIG. 5 shows an additional exemplary flow 500 for adding a new node to an existing cluster in accordance with aspects of the invention. At step 505, a new node receives a cluster identifier and discovers the voting set and version number from the cluster. At step 510, the new node sends the identified voting set to the new node's TPM. At step 515, the new node's TPM checks the validity of the identified voting set.

At step 520, the cluster determines a future voting set. At step 525, the cluster determines whether a quorum of the future voting set exists yet. That is, as explained above, if, for example, the new node will be part of the quorum of the future voting set, the cluster may need to wait for the new node to synchronize. If, at step 525, it is determined that there is not a quorum of the future voting set, then the process continues at step 525. If, at step 525, it is determined that there is a quorum of the future voting set, then at step 530, the cluster makes a committed decision to add the new node, which is signed by a quorum of the old voting set. At step 535, the cluster sends the committed decision to the TPMs of all the synchronized nodes of the cluster (including the new node).

At step 540, the TPMs validate the committed decision by verifying that the signature of the old voting set (which includes the voting set version number) corresponds with the voting set and version number stored in the TPMs. At step 545, the TPMs perform the committed decision by updating their voting sets from the old voting set to the new voting set (which includes the new node) and incrementing the voting set version number.

Removing a Node from the Cluster

According to a further aspect of the invention, a configuration process or a discovery process (e.g., a discovery that the node has disappeared) results in a decision reached by the cluster using a Byzantine fault tolerant distributed consensus protocol to remove a node from the cluster. However, similar to the process for adding a node, the cluster must determine what the new voting set will be once the node has been removed, and must wait until a quorum of the nodes of the future voting set are operational and synchronized before committing to the decision. In embodiments, this may involve waiting for one of the nodes that will remain in the cluster to resynchronize. The committed decision, in embodiments, is a cluster response in the form of a message indicating the node to be removed, which includes the cluster identifier and voting set version number to which the decision applies. According to an aspect of the invention, the message is signed by a quorum of the old voting set, which verifies that the message is a valid Byzantine fault tolerant decision reached by the cluster.

This message is passed to the TPMs on all the synchronized nodes of the cluster, which validate the cluster identifier, validate that the message is signed by a quorum of the old voting set and validate that the message applies to the current version number of the voting set. Then, according to an aspect of the invention, only if the validation is successful, will the TPMs of the cluster update their voting sets by removing the node indicated in the message and incrementing the voting set version number.

As described above, the voting set is given a new version number each time a node is added or removed. In embodiments, nodes are added or removed one at a time. Additionally, a quorum of the old voting set commits to the change before the next voting set change is allowed to be started. According to an aspect of the invention, by requiring the a quorum of old voting set commit to a change before allowing the next change to be started, the present invention ensures that the cluster never leaves behind a quorum of TPMs containing an old voting set. Moreover, as the present invention prevents the formation of a quorum of TPMs containing an old voting set, it is impossible for a client to be returned a response that passes the client's validation checks for its nonce and signatures from a quorum of TPMs unless the response was a response from a valid voting set of the cluster that was current at some point after the request was issued from the client.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable medium being operable to:
   dynamically adjust quorum requirements for a voting set V of a server cluster, comprising a plurality of servers, to ensure that a response of the server cluster to a client request remains Byzantine fault tolerant when at least one of:
       a failed server of the server cluster is replaced with at least one new server, such that a total set S of servers that have ever been members of the server cluster is increased; and
       an existing server is removed from the voting set V,
   wherein each server comprises a trusted platform module (TPM), the method further comprising the TPM at least one of: maintaining the voting set V; manipulating the voting set V; and servicing requests for the voting set V;
   the manipulating the voting set V comprises at least one of adding a new server to the server cluster and removing an existing server from the server cluster; and
   the adding the new server comprises:
       the new server receiving a cluster identifier which identifies a current voting set and a voting set version number;
       the new server's TPM checking a validity of the current voting set;
       the new server synchronizing with the server cluster;
       the server cluster determining a future voting set;
       the server cluster making a signed committed decision, which is signed by a quorum of the current voting set, to add the new server to the server cluster;

the server cluster sending the signed committed decision to each of the TPMs of the servers of the server cluster;

the each of the TPMs validating the signed committed decision;

the each of the TPMs performing the signed committed decision; and incrementing the voting set version number.

2. The method of claim 1, wherein the validating the signed committed decision comprises each TPM verifying that the current voting set and voting set version number contained in the signed committed decision corresponds with the voting set and voting set version number contained in each TPM.

3. A method implemented in a computer infrastructure having computer executable code tangibly embodied on a computer readable medium being operable to:

dynamically adjust quorum requirements for a voting set V of a server cluster, comprising a plurality of servers, to ensure that a response of the server cluster to a client request remains Byzantine fault tolerant when at least one of:

a failed server of the server cluster is replaced with at least one new server, such that a total set S of servers that have ever been members of the server cluster is increased; and an existing server is removed from the voting set V, wherein each server comprises a trusted platform module (TPM), the method further comprising the TPM at least one of: maintaining the voting set V; manipulating the voting set V; and servicing requests for the voting set V; and servicing requests for the voting set V comprises:

permitting a client to use a discovery service to identify servers purporting to be members of the server cluster;

allowing the client to request each identified server return a signed copy of each identified server's most recent voting set and voting set version numbering in order to determine a server having the highest voting set version number from the returned signed copies;

the server having the highest voting set version number receiving a request for service from the client, wherein the request includes a nonce; and the server cluster sending a response to the request to the client.

4. The method of claim 3, wherein if the response is signed by a quorum of the voting set with the highest voting set version number and includes the nonce, the response is determined to be from a current voting set and is Byzantine fault tolerant.

5. The method of claim 3, wherein the nonce comprises a number used only once to identify the request.

* * * * *